(12) United States Patent
Kosmos

(10) Patent No.: US 8,494,943 B1
(45) Date of Patent: *Jul. 23, 2013

(54) SYSTEMS AND METHODS FOR CHARITABLE LIFETIME GIVING PROGRAM

(75) Inventor: George Chris Kosmos, Seattle, WA (US)

(73) Assignee: Kosmos IP I, LLC, Seattle, WA (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/905,333

(22) Filed: Oct. 15, 2010

Related U.S. Application Data

(60) Provisional application No. 61/279,030, filed on Oct. 15, 2009.

(51) Int. Cl.
*G06Q 40/00* (2012.01)

(52) U.S. Cl.
USPC .............................. 705/36 R; 705/4

(58) Field of Classification Search
CPC ....................................... G06Q 40/00
USPC ................. 705/4, 2, 1.1, 35, 36 R, 36 T, 38, 705/39, 37, 80
See application file for complete search history.

(56) References Cited

U.S. PATENT DOCUMENTS

| | | | |
|---|---|---|---|
| 6,473,737 | B2 | 10/2002 | Burke |
| 6,950,805 | B2 | 9/2005 | Kavanaugh |
| 7,640,202 | B2 * | 12/2009 | Foti et al. .................... 705/36 R |
| 2001/0011223 | A1 * | 8/2001 | Burke ............................... 705/4 |
| 2002/0087365 | A1 * | 7/2002 | Kavanaugh ....................... 705/4 |
| 2003/0074233 | A1 * | 4/2003 | Lee .................................. 705/4 |
| 2003/0105701 | A1 * | 6/2003 | Brown et al. .................... 705/36 |
| 2004/0181436 | A1 * | 9/2004 | Lange .............................. 705/4 |
| 2005/0216316 | A1 * | 9/2005 | Brisbois et al. .................. 705/4 |
| 2008/0065425 | A1 * | 3/2008 | Giuffre et al. ................... 705/4 |
| 2008/0294566 | A1 * | 11/2008 | Hendrix et al. ............ 705/36 R |
| 2009/0037226 | A1 * | 2/2009 | Radin .............................. 705/4 |

OTHER PUBLICATIONS

Sondergeld, Eric T. "In Search of the Perfect Inflation hedge" Winter 2004 LIMRA's MarketFacts Quarterly v23n1 pp: 68-71.*
Milevsky, Moshe "The Implied Longevity Yield: A Note on Developing an Index for Life Annuities" Jun. 2005 Journal of Risk & Insurance v72n2 pp. 301-320.*
Eisbruck et al., "Rating Action: Legacy Benefits Life Insurance Settlement 2004-1 LLC —Moody's Rates Legacy Life Settlement Securitization A-1 and Baa2", Moody's Investors Service, Global Credit Research, Mar. 16, 2004, 2 pages.

* cited by examiner

*Primary Examiner* — Kelly Campen
(74) *Attorney, Agent, or Firm* — K&L Gates LLP

(57) ABSTRACT

Computer systems and computer-implemented methods related to an investment program for a non-profit, charitable organization that pairs a donated life insurance policy with one or more annuity contracts on the same donor's life. Preferably, the aggregate sum of the annuity premiums for the annuity contracts equals (or approximately equals) the death benefit payment amount of the donated life insurance policy. In addition, the ongoing annuity payments preferably are greater than the life insurance premiums, thereby providing the charitable organization with a positive rate of return that can be much higher than conventional fixed income investments.

12 Claims, 13 Drawing Sheets

Payment Frequency: Annual  
Start Date: 1/1/2009  
Birthdate: 2/11/1935  
Life Expectancy: 85

Present Value: 1,000,000  
Payment: 112,000  
Interest Rate: 4.87%

| | | | | (A) | (B) Life Ins. | (C=A+B) | (D) | (A) Annuity Accounting | | | | (B) Life Insurance Accounting | | | |
|---|---|---|---|---|---|---|---|---|---|---|---|---|---|---|---|
| Age | Year | Mo | Day | Annuity Principal Balance | Cash Surrender Value | Total Value of Linked Life/Annuity | Net Income | Annuity Cash Flow | Interest | Principal | Ending Balance | Life Insurance Cash Flow | Cost of Insurance | Increase in CSV | Cash Surrender Value |
| 1 73 | 2009 | 1 | 1 | 1,000,000 | 12,000 | 1,012,000 | (20,000) | (1,000,000) | | 1,000,000 | 1,000,000 | (32,000) | (20,000) | 12,000 | 12,000 |
| 2 74 | 2010 | 1 | 1 | 936,700 | 24,600 | 961,300 | 28,700 | 112,000 | 48,700 | (63,300) | 936,700 | (32,000) | (20,000) | 12,600 | 24,600 |
| 3 75 | 2011 | 1 | 1 | 870,318 | 38,430 | 908,748 | 25,618 | 112,000 | 45,618 | (66,382) | 870,318 | (32,000) | (20,000) | 13,830 | 38,430 |
| 4 76 | 2012 | 1 | 1 | 800,703 | 54,182 | 854,885 | 22,385 | 112,000 | 42,385 | (69,615) | 800,703 | (32,000) | (20,000) | 15,752 | 54,182 |
| 5 77 | 2013 | 1 | 1 | 727,698 | 72,642 | 800,340 | 18,995 | 112,000 | 38,995 | (73,005) | 727,698 | (32,000) | (20,000) | 18,461 | 72,642 |
| 6 78 | 2014 | 1 | 1 | 651,137 | 94,735 | 745,872 | 15,439 | 112,000 | 35,439 | (76,561) | 651,137 | (32,000) | (20,000) | 22,093 | 94,735 |
| 7 79 | 2015 | 1 | 1 | 570,848 | 121,564 | 692,412 | 11,711 | 112,000 | 31,711 | (80,289) | 570,848 | (32,000) | (20,000) | 26,829 | 121,564 |
| 8 80 | 2016 | 1 | 1 | 486,648 | 154,472 | 641,120 | 7,801 | 112,000 | 27,801 | (84,199) | 486,648 | (32,000) | (20,000) | 32,908 | 154,472 |
| 9 81 | 2017 | 1 | 1 | 398,348 | 195,103 | 593,451 | 3,700 | 112,000 | 23,700 | (88,300) | 398,348 | (32,000) | (20,000) | 40,631 | 195,103 |
| 10 82 | 2018 | 1 | 1 | 305,748 | 245,489 | 551,237 | (600) | 112,000 | 19,400 | (92,600) | 305,748 | (32,000) | (20,000) | 50,386 | 245,489 |
| 11 83 | 2019 | 1 | 1 | 208,638 | 308,150 | 516,788 | (5,110) | 112,000 | 14,890 | (97,110) | 208,638 | (32,000) | (20,000) | 62,661 | 308,150 |
| 12 84 | 2020 | 1 | 1 | 106,799 | 386,219 | 493,017 | (9,839) | 112,000 | 10,161 | (101,839) | 106,799 | (32,000) | (20,000) | 78,068 | 386,219 |
| 13 85 | 2021 | 1 | 1 | 0 | 483,598 | 483,598 | (14,799) | 112,000 | 5,201 | (106,799) | 0 | (32,000) | (20,000) | 97,379 | 483,598 |

(E) Gain on recovery of death benefit.     516,402     1,000,000

(B) Assumes use of a Life Insurance product with guaranteed premiums through age 100 and minimal cash value within the policies.
(D) Net Income is the interest income from the annuity plus the increase in the Life Insurance CVS, plus the gain realized on recovery of death benefits.
(E) The gain recovery of death benefit is the gross death benefit paid less the combined investment value of the annuity and Life Insurance (C=A+B)

FIG. 5

US 8,494,943 B1

SYSTEMS AND METHODS FOR CHARITABLE LIFETIME GIVING PROGRAM

CROSS REFERENCE TO RELATED APPLICATION

This application claims priority pursuant to 35 U.S.C. 119 (e) to co-pending U.S. Provisional Patent Application Ser. No. 61/279,030, entitled "SYSTEM AND METHOD FOR CHARITABLE LIFETIME GIVING PROGRAM," filed Oct. 15, 2009, which is hereby incorporated by reference in its entirety.

This application is related to U.S. application Ser. No. 12/905,640, entitled "SYSTEM AND METHOD FOR LIFE INSURANCE INVESTMENT VEHICLE filed Oct. 15, 2010, now U.S. Pat. No. 8,346,648, which is hereby incorporated by reference in its entirety.

BACKGROUND

There are several known mechanisms for a donor to donate a life insurance policy to a non-profit organization. One mechanism is for the donor to name the non-profit as a beneficiary on the policy. In this scenario, the non-profit organization will receive the death benefit of the donated life insurance policy when the donor dies, but the donor must continue to make the premium payments due under the donated life insurance policy, which are not tax deductible. The proceeds of the policy remain in the donor's taxable estate with an offsetting estate tax charitable deduction. Another option is for the donor to assign an existing life insurance policy to the non-profit organization and then make deductible cash gifts to the non-profit organization, which the non-profit can earmark for the policy premiums. In this scenario, the donor is able to claim an income tax deduction of either the tax basis or the fair market value of the policy (whichever is less) for the year of the deduction. Yet another option, permissible under the laws of some states, is for the donor to donate money to the non-profit organization and have the non-profit organization purchase the life insurance policy on the donor's life. In this scenario, the donation to the non-profit organization is tax deductible and the charity makes the premium payments.

Many non-profit organizations, however, do not solicit donations of life insurance policies from donors. There are several reasons for this including: (i) the ongoing premiums to keep the policy in force require additional cash contributions; (ii) the premiums paid by the non-profit organization reduce operating income needed for fund services provided by the non-profit; (iii) there is a moral hazard when the non-profit benefits from the death of a donor; (iv) the non-profit must wait until the donor dies to benefit from the donation; and (v) the donor would be better off economically to surrender the policy and make a cash donation to the non-profit organization.

FIGURES

Various embodiments are described herein by way of example in conjunction with the following figures, wherein:

FIG. 5 is a chart showing an investment program according to various embodiments;

DESCRIPTION

Various embodiments of the present disclosure involve investment programs for tax exempt, non-profit organizations (hereinafter sometimes referred to as "charitable organizations"). In the investment program, a donor donates a life insurance policy to the charitable organization. In connection with the donation of the life insurance policy, the charitable organization purchases one or more annuity contracts, such as Single Premium Immediate Annuity (SPIA) contracts on the donor's life, where the aggregate sum of the single immediate premium payments for the one or more SPIA contracts may be approximately equal to the death benefit payment amount of the donated life insurance policy. In some embodiments, the aggregate sum of the single immediate premium payments for the one or more SPIA contracts may be less than the death benefit payment amount of the donated life insurance policy. In some embodiments, the premium payments may be paid from an endowment, for example, of the charitable organization. In other embodiments, other sources of funding may be used to purchase the SPIA contracts. During the donor's life, the income to the charitable organization from the SPIA contracts preferably will be greater than the amounts of the premium payments owed on the donated life insurance policy, thereby providing a net investment gain for the charitable organization. Upon the death of the donor, the death benefit of the donated life insurance policy may offset approximately the aggregate single immediate premium payments made by the charitable organization to purchase the one or more SPIA contracts.

Figure 1:
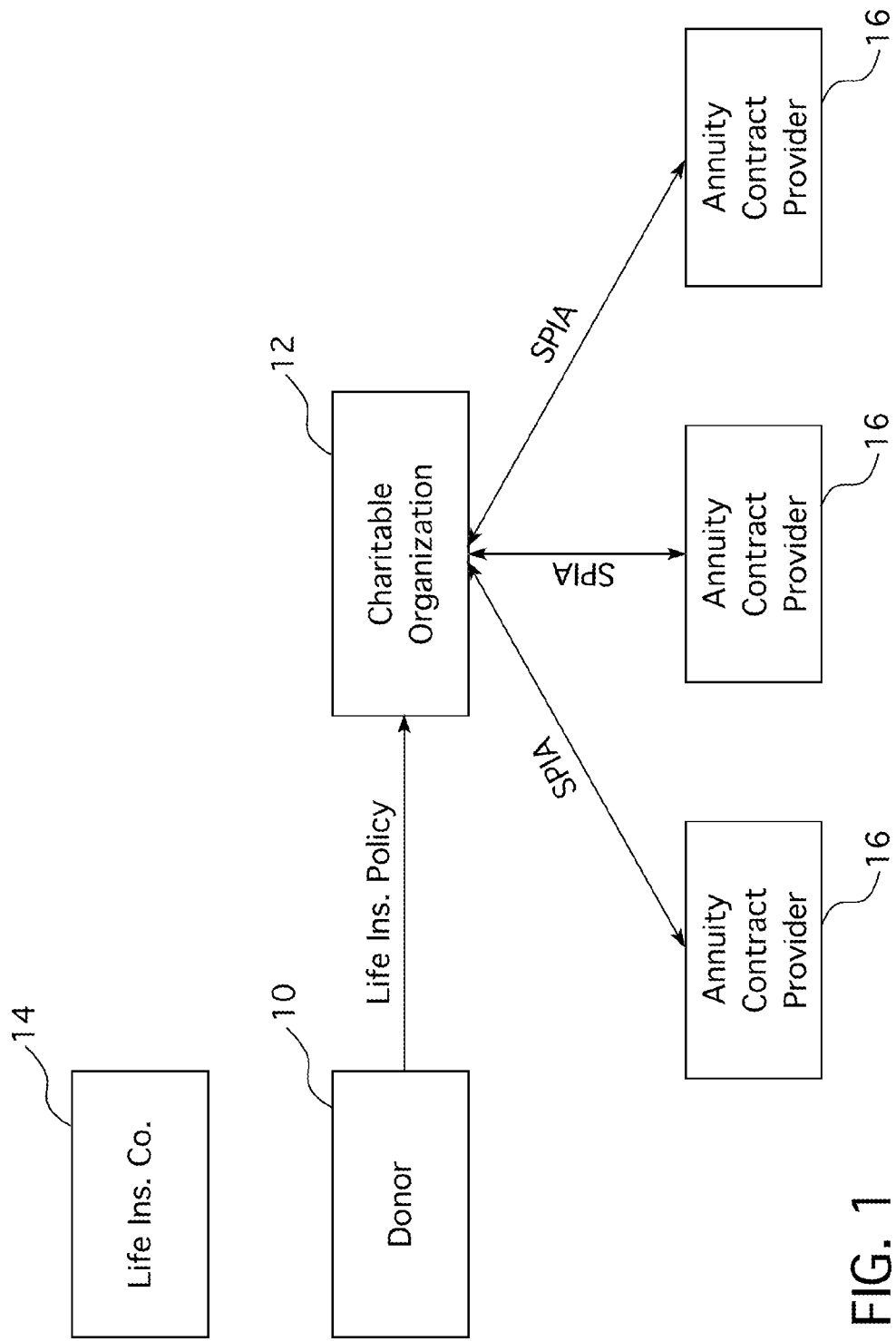
FIGS. 1-3 illustrate an embodiment of the investment program according to various embodiments.
Figure 2:
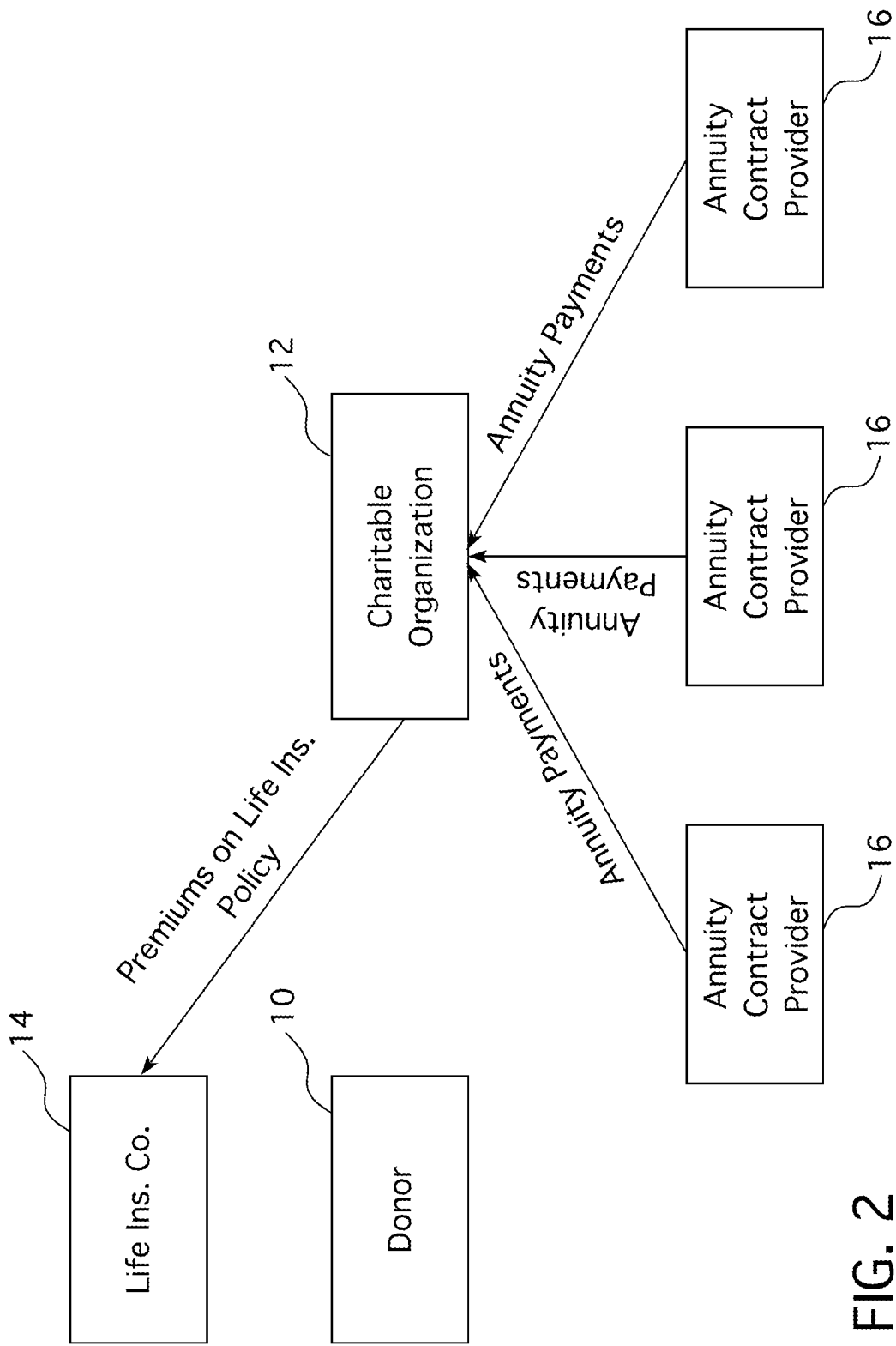
Figure 3:
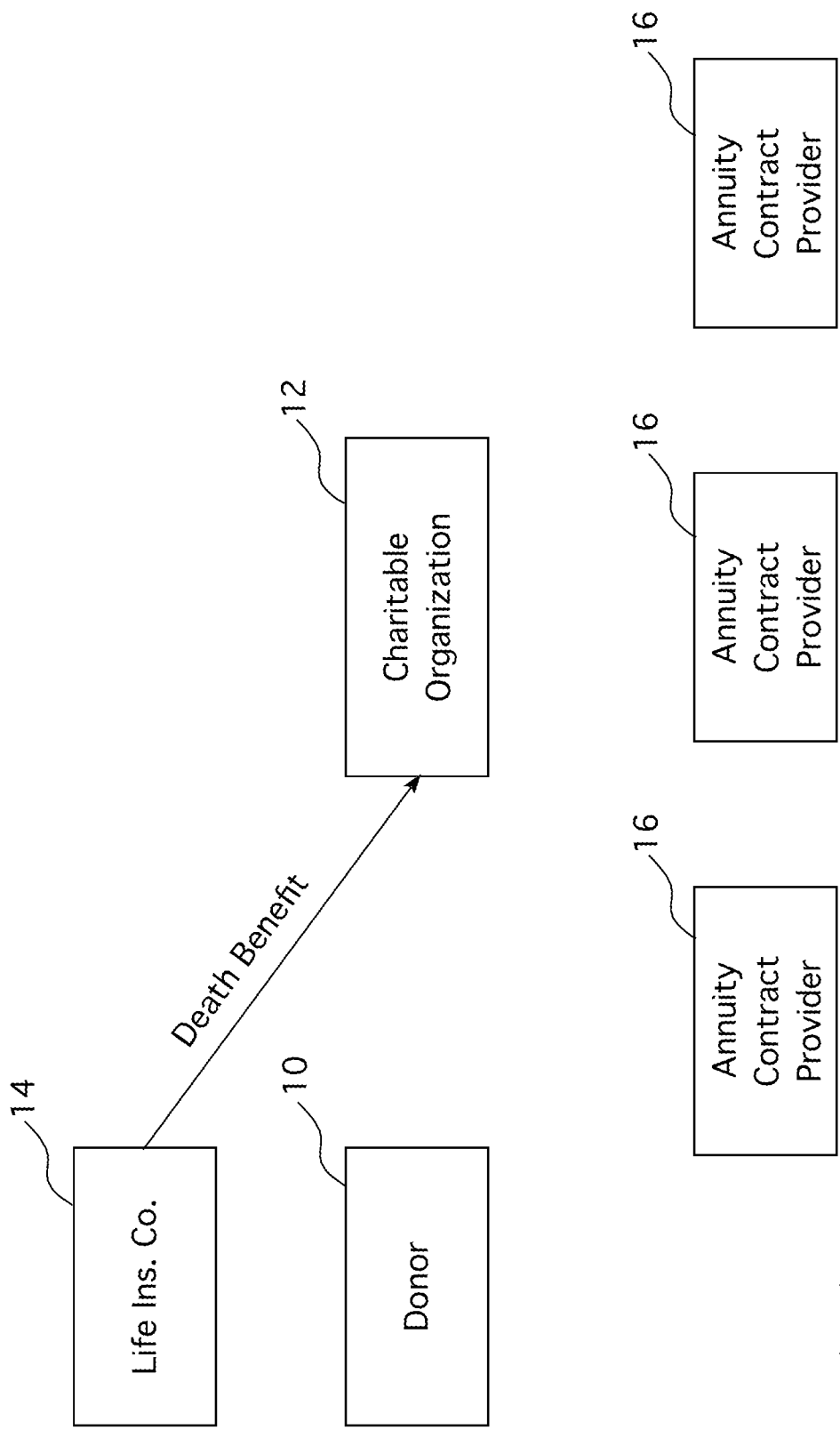

FIGS. 1-3 illustrate an embodiment of the investment program according to various embodiments. FIG. 1 illustrates aspects of the program at initiation, FIG. 2 illustrates payments made by the parties during the life of the donor after the donation of the life insurance policy, and FIG. 3 illustrates the payments made upon the donor's death. As shown in FIG. 1, at initiation, a donor 10 (i.e., an individual) donates an existing life insurance policy on the donor's life to a charitable organization 12. The life insurance policy on the donor's life is provided by a life insurance company 14. In conjunction with the donation of the life insurance policy, the charitable organization 12 also purchases one or more annuity contracts on the donor's life from annuity contract providers 16. According to various embodiments, the annuity contracts are Single Premium Immediate Annuity (SPIA) contracts, where, for each SPIA contact, the charitable organization makes a one-time, upfront, single premium payment to the annuity contract provider 16 in exchange for an obligation from the annuity contract provider 16 to make periodic annuity payments to the charitable organization 12 during the life of the donor 10. In some embodiments, the single premium payment to the annuity contract provider 16 is paid from an endowment of the charitable organization 12. In other embodiments, the single premium payment to the annuity contract provider 16 is paid from other sources of funding, such as a loan collateralized by the SPIA contracts and/or the life insurance policy, for example. The annuity payment obligations from the annuity contract provider 16 cease upon the death of the donor 10.

In one embodiment, the charitable organization 12 may be an organization that is organized and operated for purposes that are beneficial to the public interest and may qualify as tax-exempt under Section 501(c)(3) of the Internal Revenue Code. For convenience, the present disclosure is mainly described in the context of a charitable organization implementation, but the disclosure is not so limited. It is to be appreciated, that other types of entities, vehicles, or structures may acquire the life insurance policy and purchase the annuity contracts. All such implementations of the program are intended to be within the scope of this disclosure.

In various embodiments, to implement the program, the donor 10 irrevocably gives the life insurance policy to the charitable organization by signing a change of owner form for the donated life insurance policy. In addition, when the charitable organization 12 purchases the annuity contracts covering the life of the donor, the donor 10 authorizes the purchase by signing the appropriate paperwork, such as the annuity applications.

The donated life insurance policy may specify a death benefit payment amount that is to be paid to the beneficiary (e.g., the charitable organization 12) by the life insurance company 14 upon the donor's death. The life insurance policy may also require periodic premium payments to be paid to the life insurance company 14 during the life of the donor to keep the life insurance policy in force. As shown in FIG. 2, after the donation of the life insurance policy, the charitable organization 12 makes the life insurance premium payments to the life insurance company 14 during the remaining portion of the donor's life according to various embodiments. The charitable organization 12 may fund the life insurance premium payments with the periodic annuity payments from the annuity contract providers 16 on the SPIA contacts.

Although FIGS. 1-3 show the charitable organization 12 purchasing annuity contracts from three (3) annuity contract providers 16, in other embodiments fewer or more annuity contract providers 16 could be used. For example, one or two annuity contract providers 16 could be used, or more than three could also be used. To reduce the risk of default by the annuity contract providers 16, the charitable organization may purchase annuity contracts from more than one annuity contract provider 16. In addition, in some embodiments, the aggregate sum of the one-time, upfront premium payments to the annuity contract providers 16 may approximately equal (or exactly equal) the death benefit payment amount of the donated life insurance policy. For example, if the death benefit payment amount of the donated life insurance policy is $1,000,000, the charitable organization preferable purchases two or more annuity contracts where the sum of the one-time premium payments paid to the annuity contract providers 16 is approximately $1,000,000. For example, if the charitable organization 12 purchase annuity contracts from four (4) separate annuity contract providers 16, each annuity contract may require a $250,000 one-time premium payment. In another embodiment, one annuity contract may have an annuity premium payment of $100,000, the second annuity contract may have an annuity premium payment of $200,000, the second annuity contract may have an annuity premium payment of $300,000, and the fourth annuity contract may have an annuity premium payment of $400,000, such that the sum is approximately $1,000,000. These are, of course, examples and other variations may be employed. In some embodiments, the death benefit payment may be greater than the sum of the one-time premium payment(s) paid to the annuity contract provider(s). In other embodiments, the aggregate sum of the single immediate premium payments for the one or more SPIA contracts may be less than the death benefit payment amount of the donated life insurance policy. For example, in one embodiment, the aggregate sum of the single immediate premium payments for the one or more SPIA contracts may be up to 30% less than the death benefit payment amount of the donated life insurance policy.

In addition, although only one donor and one donation are shown in FIGS. 1-3, the charitable organization 12 may receive by donation numerous life insurance policies from different donors, and purchase corresponding annuity contracts for each donated life insurance policy. In various embodiments, an administrator works with the charitable organization to implement the investment program. The administrator may help the charitable organization 12 identify ideal or suitable donors. Ideal donors may include people close to the charitable organization 12. Also, preferably the donor (i) has an existing life insurance policy that he/she no longer needs or wants, and (ii) has a willingness to donate the life insurance policy to charity. The ideal donor also preferably has a life insurance policy at a standard or preferred health rating, but as of the time of the donation has some health impairment(s) that qualifies the donor for some level of "rate up" by the annuity contract providers 16. "Rated" individuals are expected to have a shortened life expectancy. That way, the charitable organization 12 experiences low life insurance premiums during the remainder of the donor's life, with a high annuity payout. This combination sometimes occurs when the donor purchased the life insurance policy at a relatively young age when the donor was in good health, but at the time of the donation has a health impairment(s) that lowers the donor's expected life duration in comparison to the donor's expected life duration at the time the life insurance policy was purchased.

Figure 4:
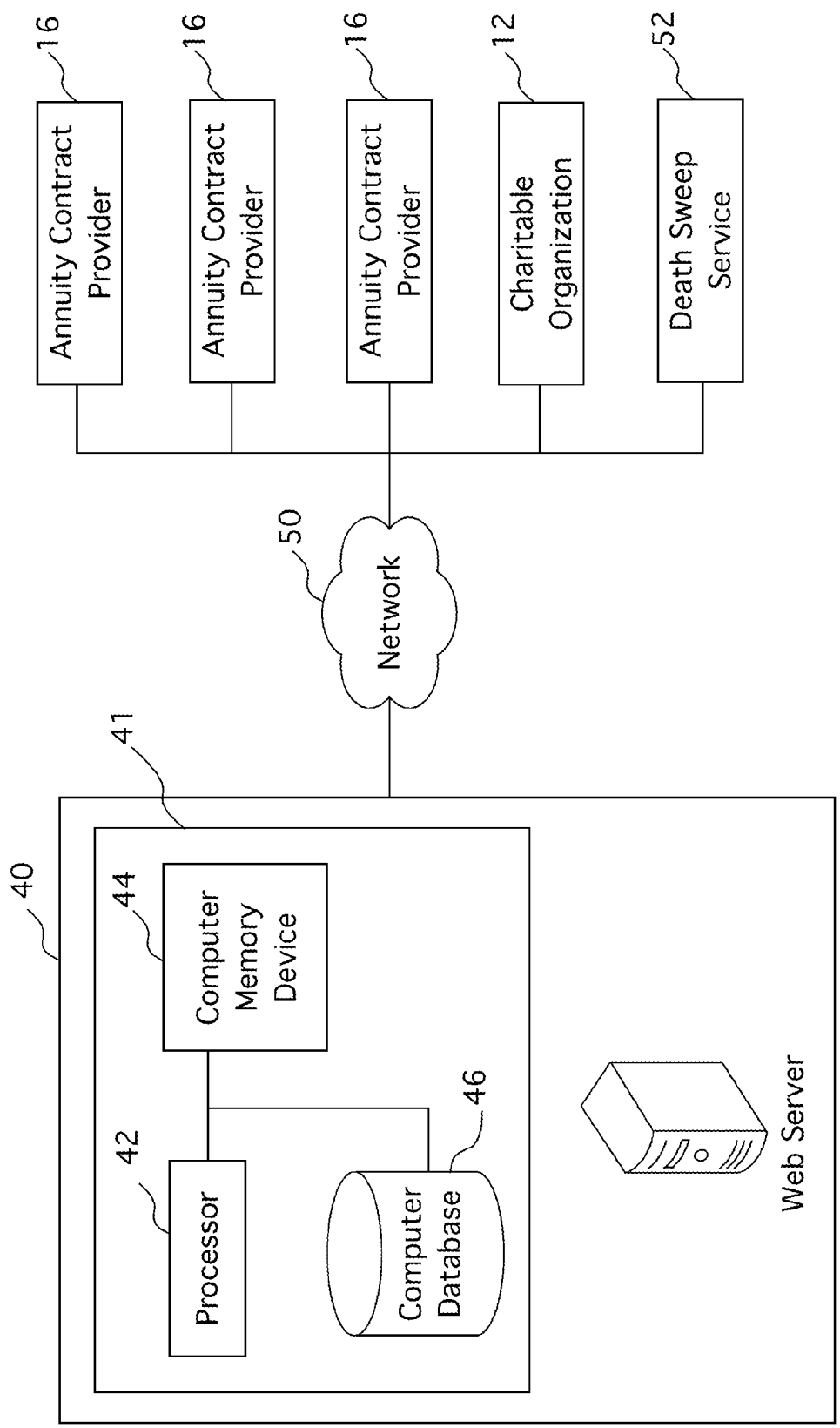
FIG. 4 is a diagram of a computer system according to various embodiments.

In various embodiments, as shown in FIG. 4, a computer system 40 may be used to solicit annuity contracts from potential annuity contract providers 16 and generate reports for the charitable organization. The computer system 40 may be administered by the administrator in various embodiments. As shown in FIG. 4, the computer system 40 may comprise a computer device 41, such as a personal computer, laptop computer, server, etc., that comprises a processor circuit 42, a computer memory device 44, and a computer database 46. The processor circuit 42 may be implemented as an integrated circuit and may execute instructions stored on the computer memory device 44. The computer memory device 44 may comprise a volatile and/or non-volatile memory circuit, such as silicon or magnetic ROM and/or RAM integrated circuits, or some other computer memory device that is suitable for storing instructions to be executed by the processor circuit 42. The computer database(s) 46 may store data used by the processor circuit(s) 42. The storage structure of the computer database(s) 46 may comprise storage devices that are directly or indirectly accessible by the processor circuit(s) 42, such as ROM and/or RAM integrated circuits, magnetic hard disk drives, flash memory, or any other suitable storage structure for storing digital data used for computing purposes.

Although only one computer device 41 is shown in FIG. 4, the administrator's computer system 40 may comprise numerous networked computer devices 41. The computer devices 41 may be connected via a LAN or WAN, for example. Also, although the computer device 41 is shown as having only one processor circuit 42, one computer memory device 44, and one computer database 46, the computer devices(s) 41 may have more than one processor circuit 42, more than one computer memory device 44, and more than one computer database 46.

As shown in FIG. 4, the administrator's computer system 40 may be in communication with computer systems for potential annuity contract providers 16 via a computer data network 50. The computer data network 50 may comprise a LAN, WAN, the Internet, and/or an extranet, or any other suitable data communication network allowing communication between computer systems. The administrator's computer system 40 may also be in communication with a computer system of the charitable organization 12 via the network 50 or some other computer data network.

In ascertaining whether a potential donor is suitable, the administrator may analyze the donor's life insurance policy and the donor's health. To do this, the administrator may obtain authorization from the donor to gather detailed insurance policy information and medical records for the donor. Data regarding the donor's life insurance policy and the donor's health may be stored in the computer database 46. The administrator's computer system 40 may transmit the medical records (or portions thereof) to selected potential annuity contract providers 16 electronically via the network 50. The annuity contract providers 16 analyze the medical records of the donor and submit a quote for an annuity contract, e.g., a SPIA contract, referenced to the donor. The annuity contract providers 16 may submit the bids electronically to the administrator's computer system 40 via the network 50, such as via email or through an online bidding portal, for example. Data regarding the annuity contract quotes from the annuity contract providers 16 may be stored in the database 46 of the computer system 40. In addition, the administrator, for example, may determine the premium and other modifications needed for the donor's life insurance policy to guarantee that the life insurance death benefit will remain in force through a certain age for the donor, such as one hundred (100) years old.

Once the expected life insurance premiums are known, and the expected annuity payments are known (based on the quotes from the annuity contract providers 16), the computer system 40 may calculate expected cash flows for the charitable organization 12, including the annual rate of return on the investment on the life expectancy of the donor. In some embodiments, the computer system 40 may calculate the annual cash flow on the investment, or other useful financial metrics, based on the life expectancy of the donor. If the charitable organization 12 decides to receive the donated life insurance policy and purchase the annuity contracts based on its review of the expected cash flows and/or expected annual return, the ownership change in the life insurance policy may be initiated and the one or more annuity contracts are purchased.

As mentioned above, if the donor has relatively low life insurance premiums but has a relatively short life expectancy, the expected annual cash flow that the charitable organization 12 can receive can greatly exceed what charitable organizations typically receive on fixed income investments, such as bonds. For example, if the donor is a 76-year old male rated to age 82 years, with a life insurance policy with a death benefit of $1,000,000, paired with one or more SPIA contracts having an aggregate premium of $1,000,000, the yearly annuity payments to the charitable organization may be $165,553 (or a return of $16.55% on the $1,000,000 investment), with yearly life insurance premiums of $25,000 (or a return of −2.50%), for a total annual net income of $140,553 (or a 14.05% return) for the charitable organization. FIG. 5 shows an example where the donor is 73 years old with a life expectancy of 85 years, and with a $1,000,000 death benefit. In the illustrated example, the cash flow from the annuity contracts is $112,000 per year and the life insurance premiums are $20,000, for a net annual return of $92,000 (or 9.2%). The decision to receive a particular life insurance policy from a donor may be based, at least in part, on the projected cash flows exceeding a predefined threshold.

Figure 6:
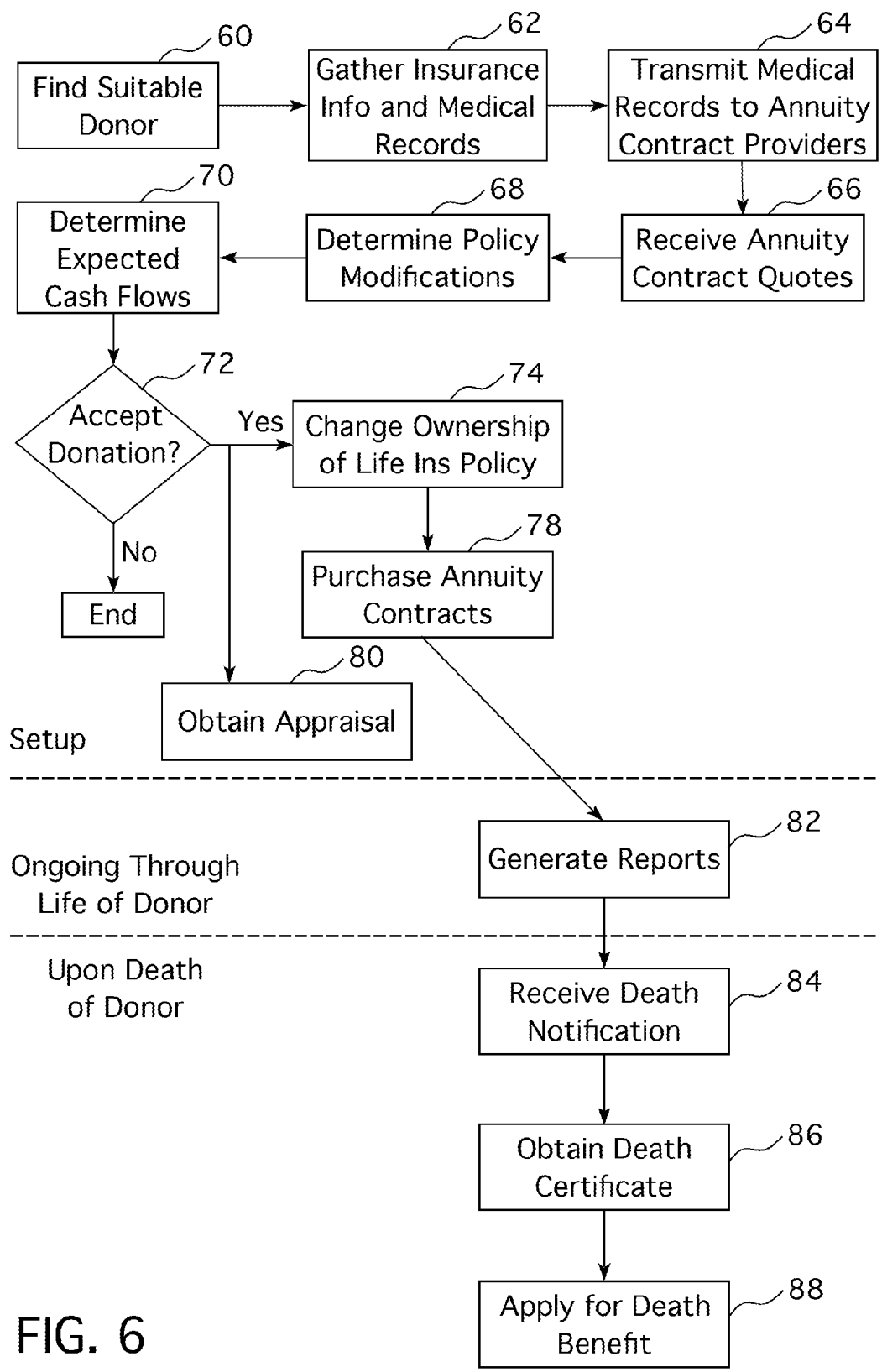
FIG. 6 is a flowchart showing a process according to various embodiments.

FIG. 6 is a flowchart illustrating a process according to various embodiments. At step 60, the administrator and the charitable organization work together to find a suitable donor of a life insurance policy. At step 62, once a potential suitable donor has been identified, the administrator may gather detailed insurance policy information and medical records regarding the donor. Data regarding the donor's life insurance policy and the donor's health may be stored in the computer database 46 of the computer system 40, for example. At step 64, the administrator, via the computer system 40 and the network 50 (see FIG. 4), may transmit data regarding the donor's medical records to potential annuity contract providers 16 for purposes of receiving quotes from the annuity contract providers 16 for annuity contracts referenced to the donor. At step 66, the administrator, via the computer system 40 and the network 50, receives the quotes from the annuity contract providers 16. Data regarding the quotes may be stored in the database 46. At step 68, the administrator, using the computer system 40, may determine the premium and other modifications needed for the donor's life insurance policy to guarantee that the life insurance death benefit will remain in force through a certain age for the donor, such as one hundred (100) years old.

At step 70, the administrator, using the computer system 40, may compute the expected cash flows for the charitable organization for the life expectancy of the donor, assuming the donor makes the donation of the life insurance policy, and based on (i) the quotes for the annuity contracts from the annuity contract providers 16 and (ii) the expected premiums to be paid under the life insurance policy, including the expected modifications to the policy determined at step 68. As mentioned above, the expected cash flows may be based on a selection of one or more of the annuity contracts from the quotes, where the aggregate sum of the immediate premium payments for the one or more annuity contracts may be approximately equal to the death benefit payment amount of the life insurance policy to be donated by the donor. In some embodiments, the death benefit amount may be within about 30% of the aggregate sum of the immediate premium payments. In some embodiments, the death benefit amount may be within about 10% of the aggregate sum of the immediate premium payments. In some embodiments, the death benefit amount may be within about 2% of the aggregate sum of the immediate premium payments. At step 72, based on the expected cash flows and other potential considerations, the charitable organization determines whether to implement the combined life insurance policy donation—annuity contract investment. For example, the determination whether to implement the combined life insurance policy donation—annuity contract investment may be based on whether the projected cash flows exceed a predefined threshold or other target.

If the charitable organization decides to pursue the investment, at step 74, the ownership change in the life insurance policy may be initiated and at step 78 the one or more annuity contracts are purchased by the charitable organization. The administrator may assist the donor and/or the charitable organization in performing these steps.

Figure 7:
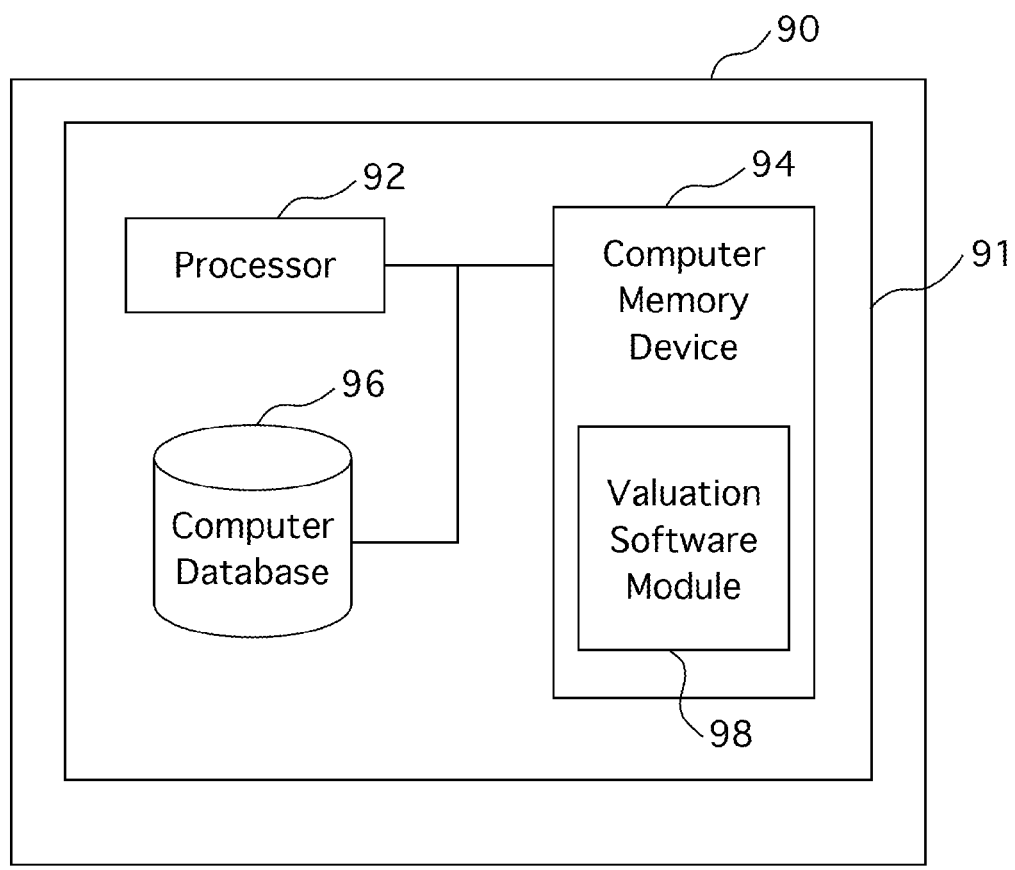
FIG. 7 is a diagram of a valuation computer system according to various embodiments.

At step 80, the value of the donated life insurance policy may be appraised. According to various embodiments, the donated life insurance policy may be appraised using a computer system 90, as shown in FIG. 7. As shown in FIG. 7, the computer system 90 may comprise a computer device 91, such as a personal computer, laptop computer, server, etc., that comprises a processor circuit 92, a computer memory device 94, and a computer database 96. The processor circuit 92 may be implemented as an integrated circuit and may execute instructions stored on the computer memory device 94. The computer memory device 94 may comprise a volatile and/or non-volatile memory circuit, such as silicon or magnetic ROM and/or RAM integrated circuits, or some other computer memory device that is suitable for storing instructions to be executed by the processor circuit 92. The computer database(s) 96 may store data used by the processor circuit(s) 92. The storage structure of the computer database(s) 96 may comprise storage devices that are directly or indirectly accessible by the processor circuit(s) 92, such as ROM and/or RAM integrated circuits, magnetic hard disk drives, flash memory, or any other suitable storage structure for storing digital data used for computing purposes.

As shown in FIG. 7, the computer memory device 94 may comprise valuation software 98 that when executed by the processor 92 causes the processor 92 to compute a fair market value for the life insurance policy based on mortality data stored in the database 96. In one embodiment, the fair market value of the life insurance policy is determined based on projected cash flows of the insurance policy over the expected lifetime of the donor using a present value technique. The fair market value appraisal may be used by the donor to support a tax deduction for the donor based on the donated life insurance policy, and may be used by the charitable organization for its records and reporting.

Although only one computer device 91 is shown in FIG. 7, the life insurance policy appraisal computer system 90 may comprise numerous networked computer devices 91. The computer devices 91 may be connected via a LAN or WAN, for example. Also, although the computer device 91 is shown as having only one processor circuit 92, one computer memory device 94, and one computer database 96, the computer devices(s) 91 may have more than one processor circuit 92, more than one computer memory device 94, and more than one computer database 96. Also, the valuation computer system 90 may be in communication with the computer system 40 via network 50 (see FIG. 4).

Referring back to FIG. 6, at step 82, the administrator's computer system 40 may generate reports on the investment for the charitable organization and transmit them to the charitable organization via the network 50. The charitable organization may receive numerous donated life insurance policies from separate donors, and purchase corresponding SPIA contracts for each donated life insurance policy. Data regarding each of the donated life insurance policies and corresponding SPIA contracts may be stored in the database 46. The reports generated by the administrator at step 82 may summarize all or the current investments involving each of the donated life insurance policies. The reports may be generated periodically, such as quarterly (i.e., every three months). The reports may detail information such as the life insurance premiums paid by the charitable organization in the reporting period, the annuity payments received by the charitable organization in the reporting period, and any death benefit payments received by the charitable organization in the case of a donor who died. The reports may also report information such as principal balances of the annuity contracts, the cash surrender values of the donated life insurance policies, and other financial information related to the donated life insurance policies and/or the annuity contracts. In one embodiment, the computer system 40 may comprise a computer-based web server and the reports may be posted on the web server. The charitable organization may then log into the web server using a secure password to access and/or download the reports from the web server via the network 50.

In addition, at step 84, the computer system 40 may receive electronic notification from a computerized death sweep service 52 (see FIG. 4) via the network 50 when a donor has died. The administrator or the charitable organization may provide identifying information for the donors, such as social security numbers, to the death sweep service 52. The death sweep service 52 searches other databases based on the donor's identifying information for data about the death of donors. When the death sweep service 52 determines that one of the donors has died, it sends a notification to the computer system 40 via the network 50, such as email. At step 86, the administrator may obtain the death certificate for the deceased donor and at step 88 apply for the death benefit payment from the deceased donor's life insurance carrier on the charitable organization's behalf.

According to various embodiments, the present disclosure is directed to a computer-implemented method that comprises the step of computing, by a computer system, expected cash flows for a charitable organization based on (i) an existing life insurance policy to be donated by a donor to the charitable organization and (ii) one or more Single Premium Immediate Annuity (SPIA) contracts, wherein: the life insurance policy has a death benefit payout amount payable to the owner of the life insurance policy upon the death of the donor; premium payments are owed on the life insurance policy during the life of the donor to keep the life insurance policy in force; a sum of annuity premium amounts for the one of more SPIA contracts is approximately equal to or less than the death benefit payout amount of the life insurance policy to be donated to the charitable organization. The method may also comprise the steps of, based on the computed expected cash flows, receiving, by the charitable organization, the donation of the life insurance policy from the donor when the cash flow exceeds a predefined amount, and purchasing, by the charitable organization, the one or more SPIA contracts. In some embodiments each of the one or more SPIA contracts may be purchased from separate annuity contract providers for an annuity premium amount. According to various implementations, the method further comprises, prior to computing the expected cash flows, (i) receiving, by the computer system, via a computer data network, a plurality of quotes for the one or more SPIA contracts from a plurality of annuity contract providers; (ii) storing quote data about the plurality of quotes in a computer database; and (iii) determining the one or more SPIA contracts to be purchased based on the quote data.

In another general embodiment, the present disclosure is directed to a computer system that comprises a computer database, one or more processor circuits, and one or more computer memory devices. The computer database may store data that comprises: (i) life insurance policy data that comprises data about a life insurance policy to be donated by a donor to a charitable organization, the life insurance policy having a death benefit payout amount payable to the owner of the life insurance policy upon the death of the donor, and wherein premium payments are owed on the life insurance policy during the life of the donor to keep the life insurance policy in force; and (ii) annuity contract data that comprises data about one or more Single Premium Immediate Annuity (SPIA) contracts to be purchased by the charitable organization, wherein each of the one or more SPIA contracts is purchased by the charitable organization from a separate annuity contract provider for an annuity premium amount, wherein a sum of annuity premium amounts for the one of more SPIA contracts is approximately equal to or less than the death benefit payout amount of the life insurance policy donated to the charitable organization. In one embodiment, the sum of annuity premium amounts for the one of more SPIA contracts is approximately 30% lower than the death benefit payout amount of the life insurance policy donated to the charitable organization. The one or more memory devices store instructions that when executed by the one or more processor circuits cause the one or more processor circuits to compute expected cash flows for the charitable organization for the life insurance policy and the one or more SPIA contracts based on the life insurance policy data and the annuity contract data stored in the computer database.

According to various embodiments, the present disclosure is directed to a computer-implemented method that comprises the step of computing, by a computer system, expected cash flows for an entity based on (i) an existing life insurance policy to be acquired by the entity and (ii) one or more Single Premium Immediate Annuity (SPIA) contracts, wherein: the life insurance policy has a death benefit payout amount payable to the owner of the life insurance policy upon the death of the insured; premium payments are owed on the life insurance policy during the life of the insured to keep the life insurance policy in force; a sum of the reoccurring annuities from the SPIA contracts exceeds the reoccurring premium payments owed on the life insurance policy; and the computer system comprises at least one computer device that comprises a processor and a computer memory device. The at least one computer device may be programmed to compute the expected cash flows based on data regarding the life insurance policy and the one or more SPIA contracts. The data regarding the life insurance policy and the one or more SPIA contracts may be stored in one or more computer databases of the computer system. Based on the computed expected cash flows, the method may comprise acquiring, by the entity, the life insurance policy from the insured; and purchasing, by the entity, the one or more SPIA contracts.

The general aspect of combining one or more life insurance policies with one or more annuities to create cash flow and/or a rate of return may be incorporated into a variety of embodiments, all of which are intended to be covered by the present disclosure. As discussed in more detail below, in one embodiment, for example, an investment vehicle (e.g., a fund) may acquire insurance policies and corresponding annuities to provide investors with positive cash flow. Among other benefits, there is essentially no correlation between the investment vehicle and the stock market because life insurance policies have virtually no relation to the stock market. Furthermore, in some states, life insurance claims have a high priority in bankruptcy law thereby lowering the risk associated with bankruptcies.

Figure 8:
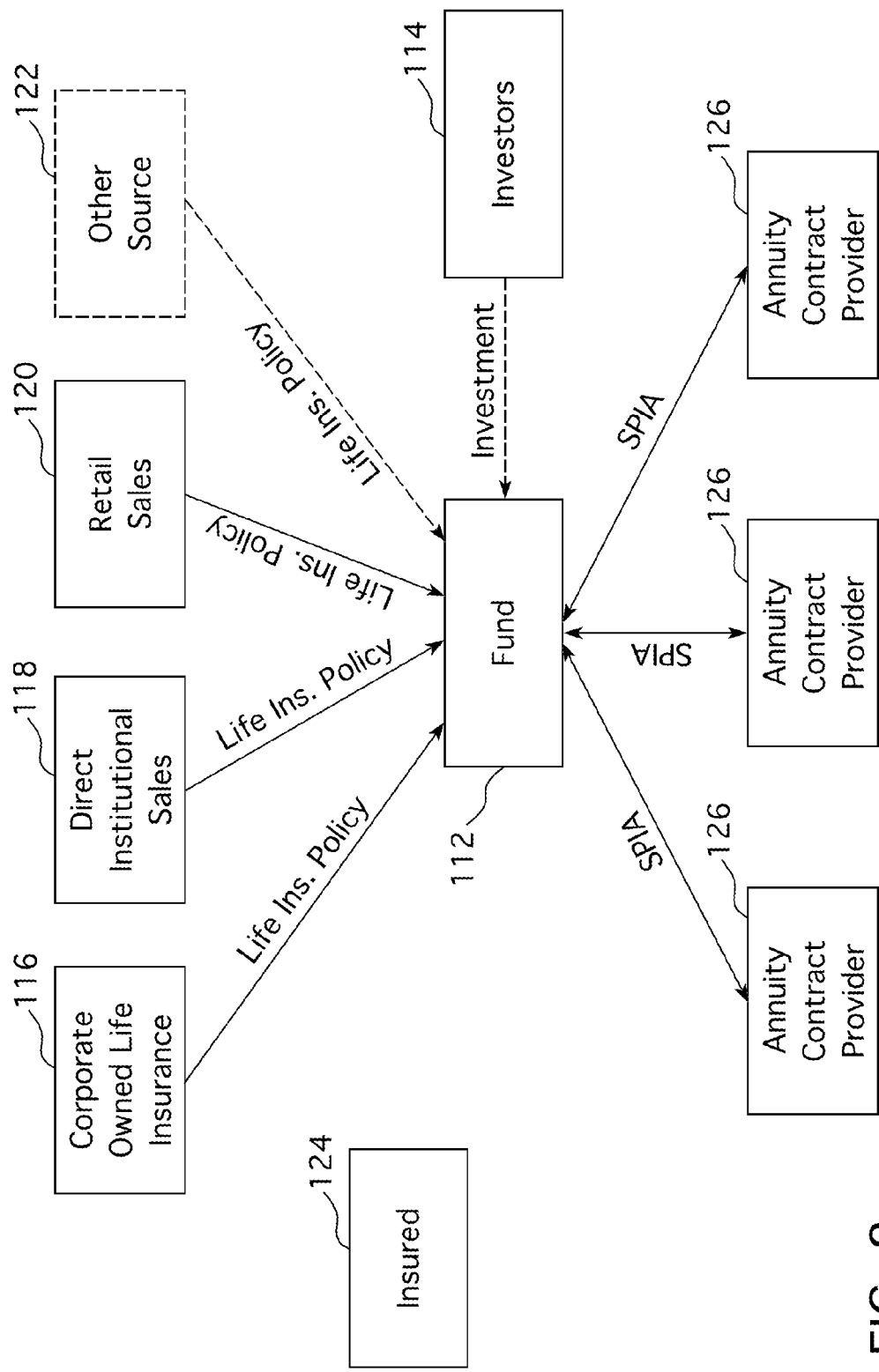
FIGS. 8-11 illustrate an embodiment of the investment program according to various embodiments.

FIG. 8 illustrates aspects of an investment fund program at initiation. A fund 112 used by the program may be any suitable investment vehicle. The fund 112 may be, for example, a limited liability partnership, a limited liability company, or another suitable type of entity. In one embodiment, the fund 112 is a private placement fund. In any event, the investors 114 may invest in the fund 112 using any suitable investment technique. The investors 114 may be any type of entity capable of investing in the fund 112. For example, the investors 114 may comprise investments on behalf of pension and/or endowment funds, institutional investors, high net worth individuals, or high net worth retail clients, for example. In one embodiment, the investors 114 may buy, for example, limited partnership shares in the fund 112. In one embodiment, the fund 112 may issue debt instruments. As is to be appreciated, a wide variety of other investment techniques may be used.

The fund 112 purchases previously issued life insurance policies from any number of sources, such as individuals, corporations, or institutions that own the policy. As illustrated in FIG. 8, the fund 112 may purchase one or more previously issued corporate owned life insurance policy 116, for example. In some embodiments, the fund 112 may purchase life insurance policies from direct institutional sales 118, retail sales 120, or other sources 122. In any event, the previously issued life insurance policy acquired from any one of the sources is tied to an insured 124 such that the fund 112 is entitled to receive a death benefit upon the death of the insured 124. As is to be appreciated, the fund 112 may purchase any number of life insurance policies such that the fund 112 holds a plurality of life insurance policies that are each connected to a different insured 124. In some embodiments, the fund 112 may hold a plurality of life insurance policies for the same insured. The fund 112 may use funds provided by the investors to purchase the life insurance policies. In some embodiments, the fund 112 may borrow funds from a lender and then use the borrowed funds to purchase the life insurance policies.

In connection with the life insurance policies, the fund 112 may also purchase one or more annuity contracts on the insured's life from an annuity contract provider 126. As illustrated, the fund 112 may purchase a plurality of annuity contracts from a plurality of annuity contract providers 126. Similar to previously described embodiments, the annuity contracts may be single premium immediate annuities (SPIA) contracts where, for each SPIA contract, the fund 112 makes a one time, upfront, single premium payment to the annuity contract provider 126 in exchange for an obligation from the annuity contract provider 126 to make periodic annuity payments to the fund 112 during the life of the insured 124. The fund 112 may use funds provided by the investors to purchase the SPIA contracts. In some embodiments, the fund 112 may borrow funds from a lender and then use the borrowed funds to purchase the SPIA contracts.

The fund 112 may operate with a pre-defined or target leverage ratio. The fund 112 may collect about $6,000,000, for example, from the investors 114. Using the $6,000,000, the fund 112 may buy life insurance policies having death benefits worth approximately $100,000,000 in the aggregate. The life insurance policies may be purchased on the secondary life insurance market. The fund 112 may then purchase about $60,000,000 worth of annuity contracts using borrowed funds. The borrowed funds may use, for example, the annuities themselves and/or one or more of life insurance policies as collateral. In this embodiment, the periodic annuities disbursed by the annuity contract providers will at least cover the periodic premiums that must be paid to the life insurance policy providers. Additionally, upon the death of the insureds associated with the $100,000,000 worth of life insurance policies, there will be a positive cash flow of $40,000,000. The leverage ratio in this example is 10:1 and is derived by dividing the amount of funds borrowed (i.e., $60M) by the initial investment by the investors (i.e., $6M).

As is to be appreciated, other embodiments may utilize different leverage ratios, such as, 1:1, 5:1 or 15:1, for example. This disclosure is not intended to be limited to any particular leverage ratio. In another embodiment, for example, the fund 112 may collect about $37,500,000, for example, from the investors 114. Using the $37,500,000, the fund 112 may buy life insurance policies having death benefits worth approximately $100,000,000 in the aggregate. The life insurance policies may be purchased on the secondary life insurance market. The fund 112 may then purchase about $70,000,000 worth of annuity contracts using raised equity and borrowed funds.

Figure 9:
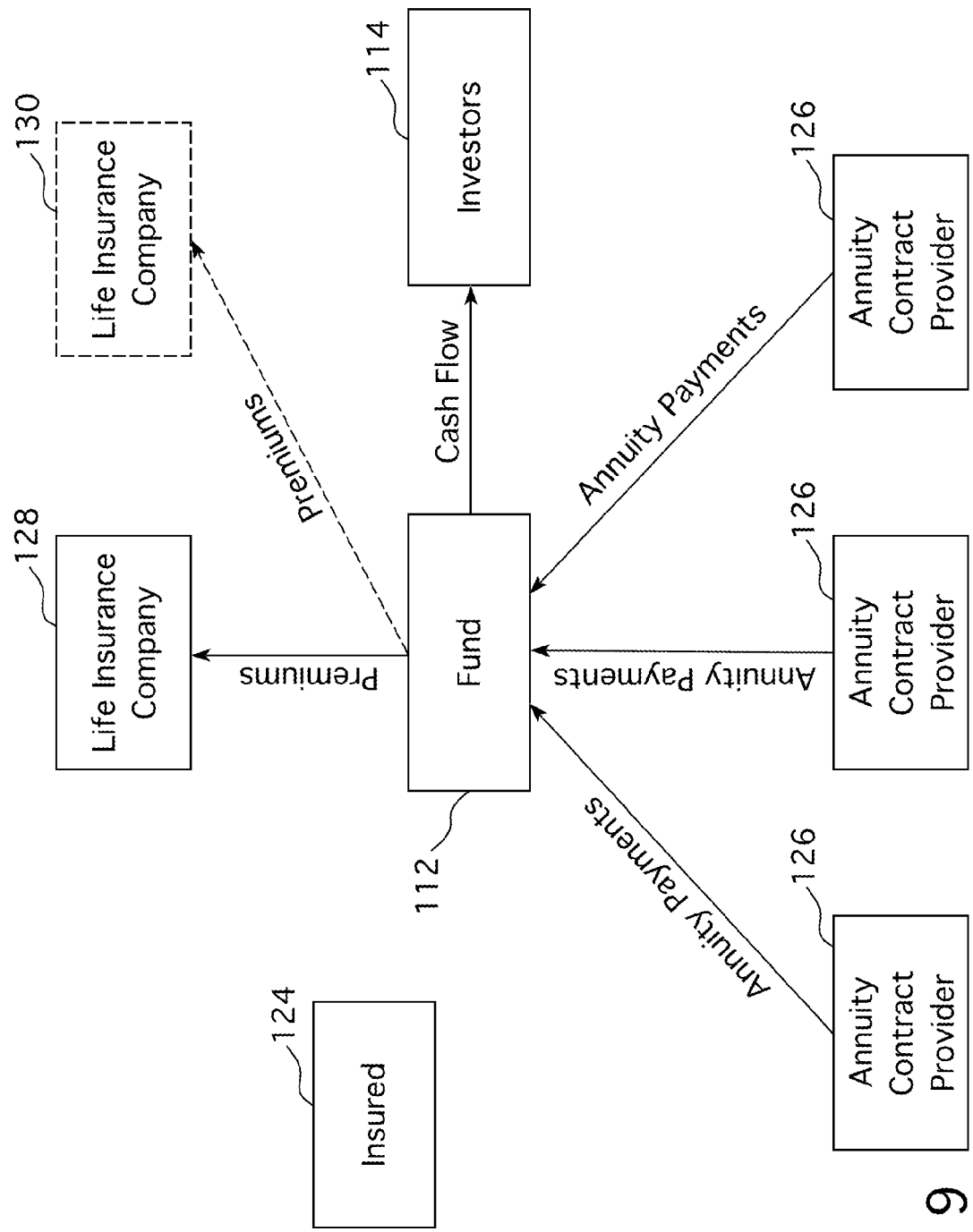

FIG. 9 illustrates the operation of the fund 112 after the acquisition of at least one life insurance policy. As illustrated, the annuity contract providers 126 provide periodic annuity payments (e.g., monthly, quarterly, yearly) to the fund 112. The fund 112, in turn, provides the necessary premiums to the life insurance company 128. As illustrated, the fund 112 may provide premiums to a plurality of life insurance companies if the fund 112 has acquired multiple life insurance policies. For example, in addition to paying the premiums to life insurance company 128, the fund 112 may also pay premiums to a life insurance company 130. As is to be appreciated, while FIG. 9 illustrates payment from the fund 112 to a life insurance company 128, it is to be appreciated that the payment may actually be made to an intermediary. FIG. 9 provides a simplified schematic for clarity.

Still referring to FIG. 9, the investors 114 may realize a positive cash flow from the fund 112 based on the difference between the annuity payment received from the annuity contract provider 126 and the premiums paid to the life insurance companies 128 and 130. As is to be appreciated, the cash flow will be reduced by any operational or overhead costs associated with managing the fund 112, including debt interest, for example. As is to be appreciated, the process of receiving annuity payments from an annuity contract provider 126 and paying life insurance premiums to a life insurance company 128 may continue until the death of the insured 124.

Figure 10:
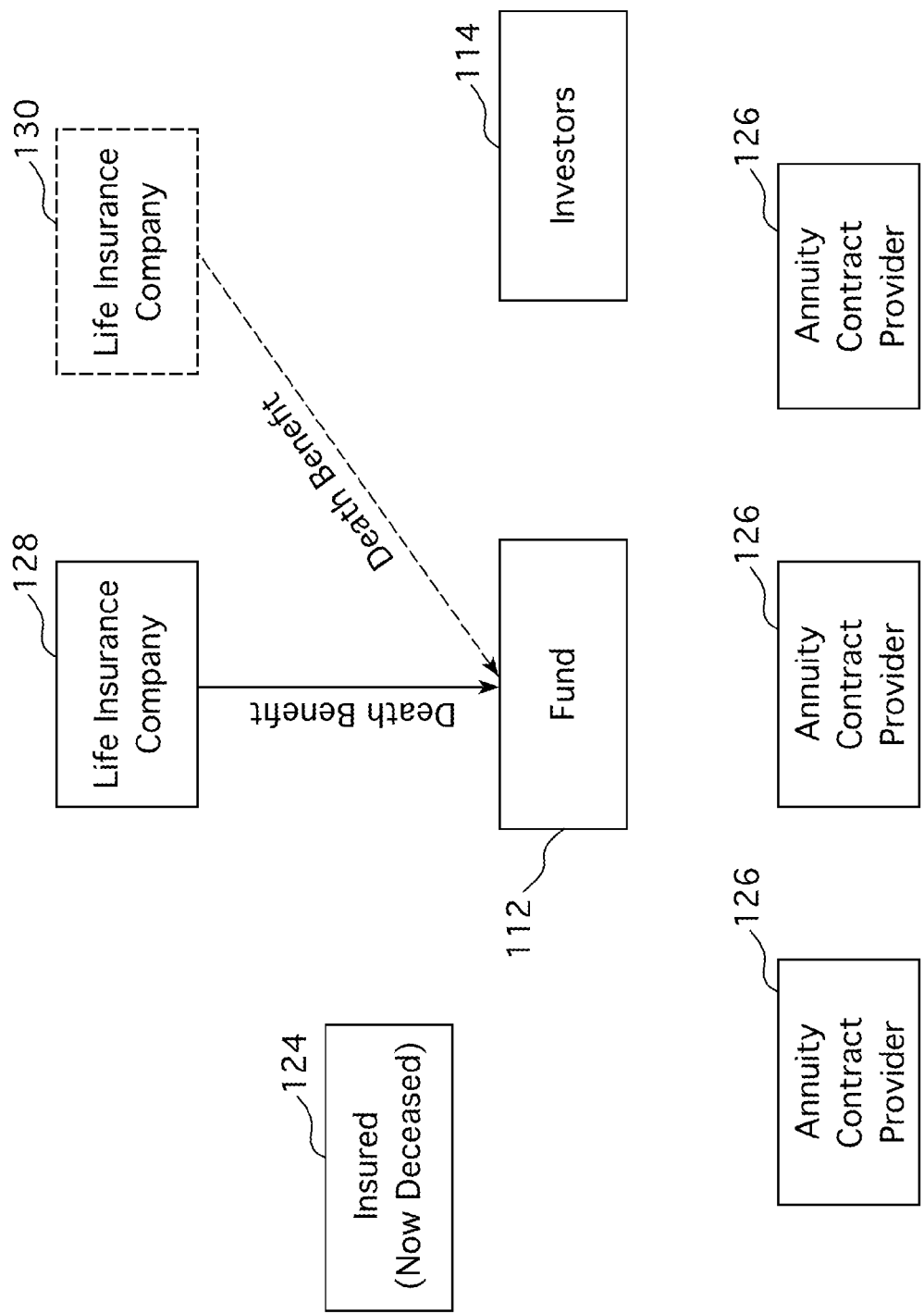
Figure 11:
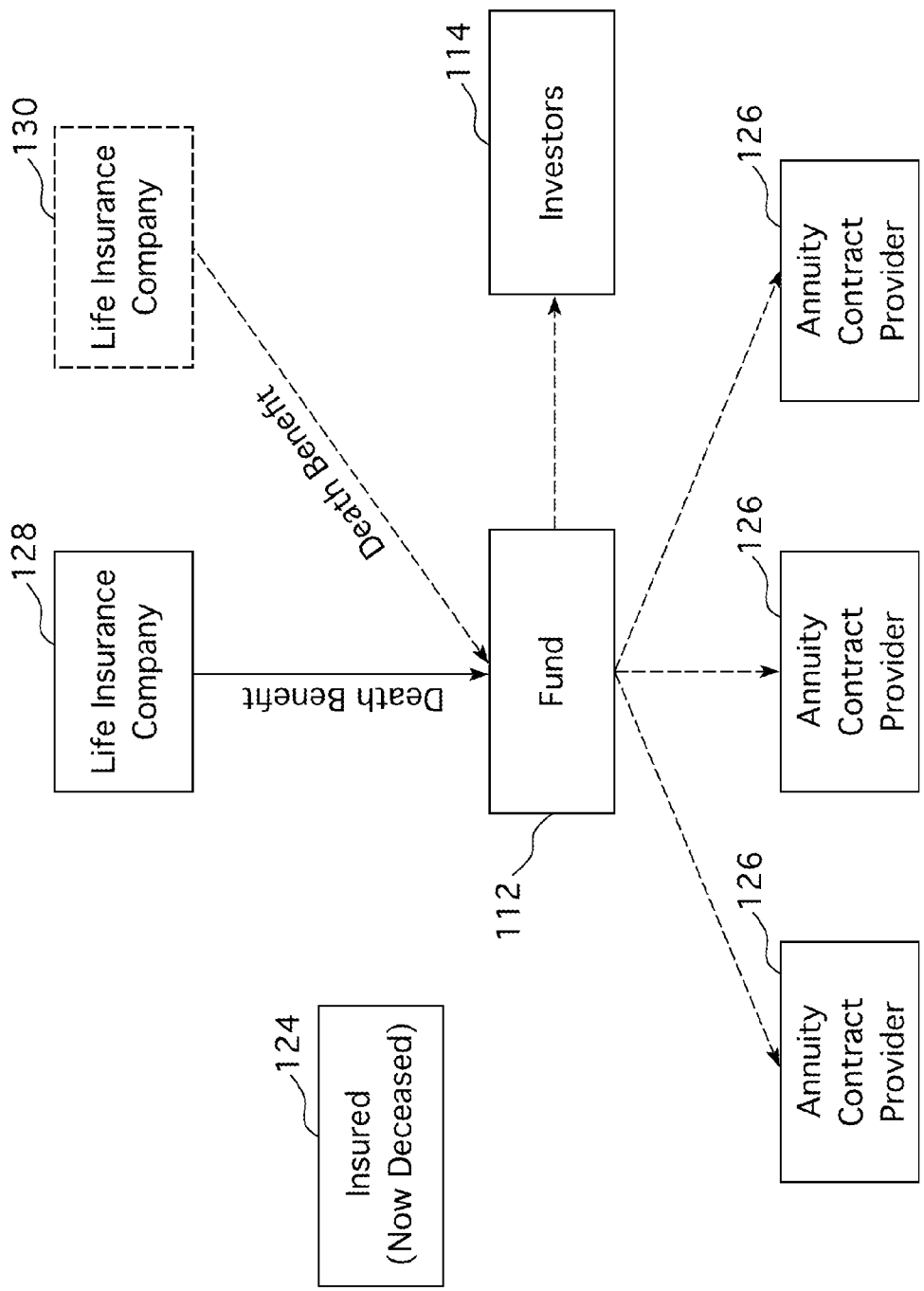

FIG. 10 illustrates the operation of the fund 112 after the insured 124 has deceased. As illustrated, the life insurance companies 128 and 130 provide a death benefit to the fund 112. Furthermore, the annuity contract providers 126 obligation to make annuity payments to the fund 112 upon the death of insured 124 ceases. Referring now to FIG. 11, the fund 112 may handle the death benefit in a variety of ways. The handling of the death benefit by the fund 112 may depend upon whether the fund is structured as a closed-end or an open-end fund, for example. In one embodiment, the death benefit is distributed to the investors 114 on a pro rata basis based on a variety of factors, such as the amount of their investment in the fund 112. In another embodiment, the death benefit is used to purchase additional life insurance policies and corresponding annuity contracts from the annuity contract providers 126. In some embodiments, a portion of the death benefit may be disbursed to the investors 114 and the remainder portion may be used to purchase additional annuity contracts and/or additional life insurance policies. As is to be appreciated, the fund 112 may have any suitable structure. All such structures and implementations are intended to be covered by the present disclosure.

Figure 12:
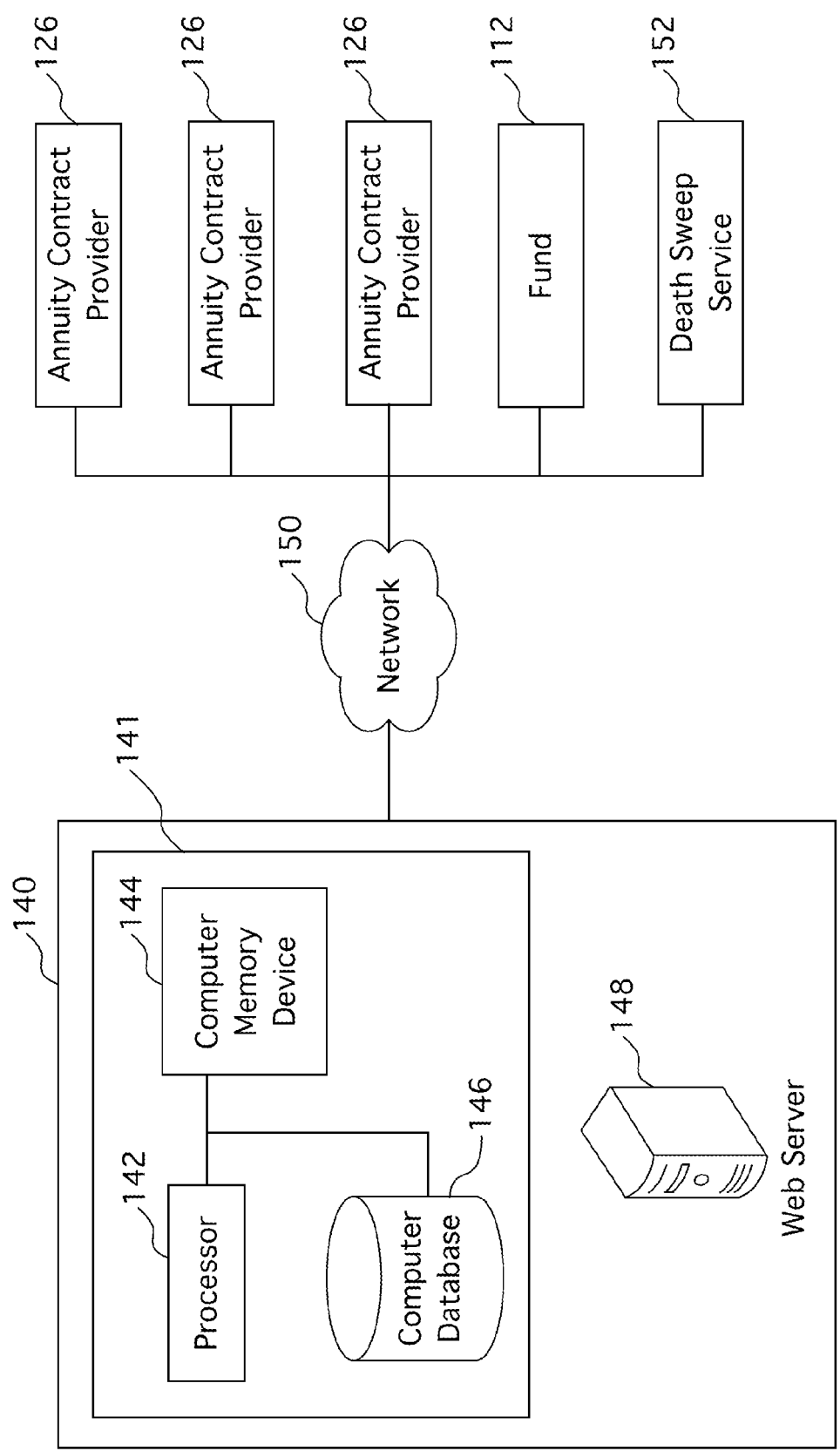
FIG. 12 is a diagram of a computer system according to various embodiments.

In various embodiments, as shown in FIG. 12, a computer system 140 may be used to solicit annuity contracts from potential annuity contract providers 126 and generate reports for the fund 112. The computer system 140 may be administered by the fund manager, for example. Similar to FIG. 4, the computer system 140 shown in FIG. 12 may comprise a computer device 141, such as a personal computer, laptop computer, server, etc., that comprises a processor circuit 142, a computer memory device 144, and a computer database 146. The processor circuit 142 may be implemented as an integrated circuit and may execute instructions stored on the computer memory device 144. The computer memory device 144 may comprise a volatile and/or non-volatile memory circuit, such as silicon or magnetic ROM and/or RAM integrated circuits, or some other computer memory device that is suitable for storing instructions to be executed by the processor circuit 142. The computer database(s) 146 may store data used by the processor circuit(s) 142. The storage structure of the computer database(s) 146 may comprise storage devices that are directly or indirectly accessible by the processor circuit(s) 142, such as ROM and/or RAM integrated circuits, magnetic hard disk drives, flash memory, or any other suitable storage structure for storing digital data used for computing purposes.

Although only one computer device 141 is shown in FIG. 12, the computer system 140 may comprise numerous networked computer devices 141. The computer devices 141 may be connected via a LAN or WAN, for example. Also, although the computer device 141 is shown as having only one processor circuit 142, one computer memory device 144, and one computer database 146, the computer devices(s) 141 may have more than one processor circuit 142, more than one computer memory device 144, and more than one computer database 146.

As shown in FIG. 12, the computer system 140 may be in communication with computer systems for potential annuity contract providers 126 via a computer data network 150. The computer data network 150 may comprise a LAN, WAN, the Internet, and/or an extranet, or any other suitable data communication network allowing communication between computer systems. The computer system 140 may also be in communication with a computer system of the fund 112 via the network 150 or some other computer data network.

In ascertaining whether a potential life insurance policy is suitable, the fund manager may analyze the insured's life insurance policy and the insured's health. To do this, the administrator may obtain authorization from the insured, or other owner of the insurance policy, to gather detailed insurance policy information. The administrator may obtain the necessary authorizations from the insured, such as HIPAA authorization, for example, to obtain medical records for the insured. Data regarding the insured's life insurance policy and the insured's health may be stored in the computer database 146. The computer system 140 may transmit the medical records (or portions thereof) to selected potential annuity contract providers 126 electronically via the network 150. The annuity contract providers 126 may analyze the medical records of the insured and submit a quote for an annuity contract, e.g., a SPIA contract, referenced to the insured. The annuity contract providers 126 may submit the bids electronically to the administrator's computer system 140 via the network 150, such as via email or through an online bidding portal, for example. Data regarding the annuity contract quotes from the annuity contract providers 126 may be stored in the database 146 of the computer system 140. In addition, the administrator, for example, may determine the premium and other modifications needed for the insured's life insurance policy to guarantee that the life insurance death benefit will remain in force through a certain age for the insured, such as one hundred (100) years old.

Once the expected life insurance premiums are known, and the expected annuity payments are known (based on the quotes from the annuity contract providers 126), the computer system 140 may calculate expected cash flows, rate of returns, and/or other metrics, for the fund 112, including the annual cash flow on the investment on the life expectancy of the insured. If the fund 112 decides to purchase the life insurance policy and purchase the annuity contracts based on its review of the expected cash flows and/or expected annual return, the ownership change in the life insurance policy may be initiated and the one or more annuity contracts are purchased.

Figure 13:
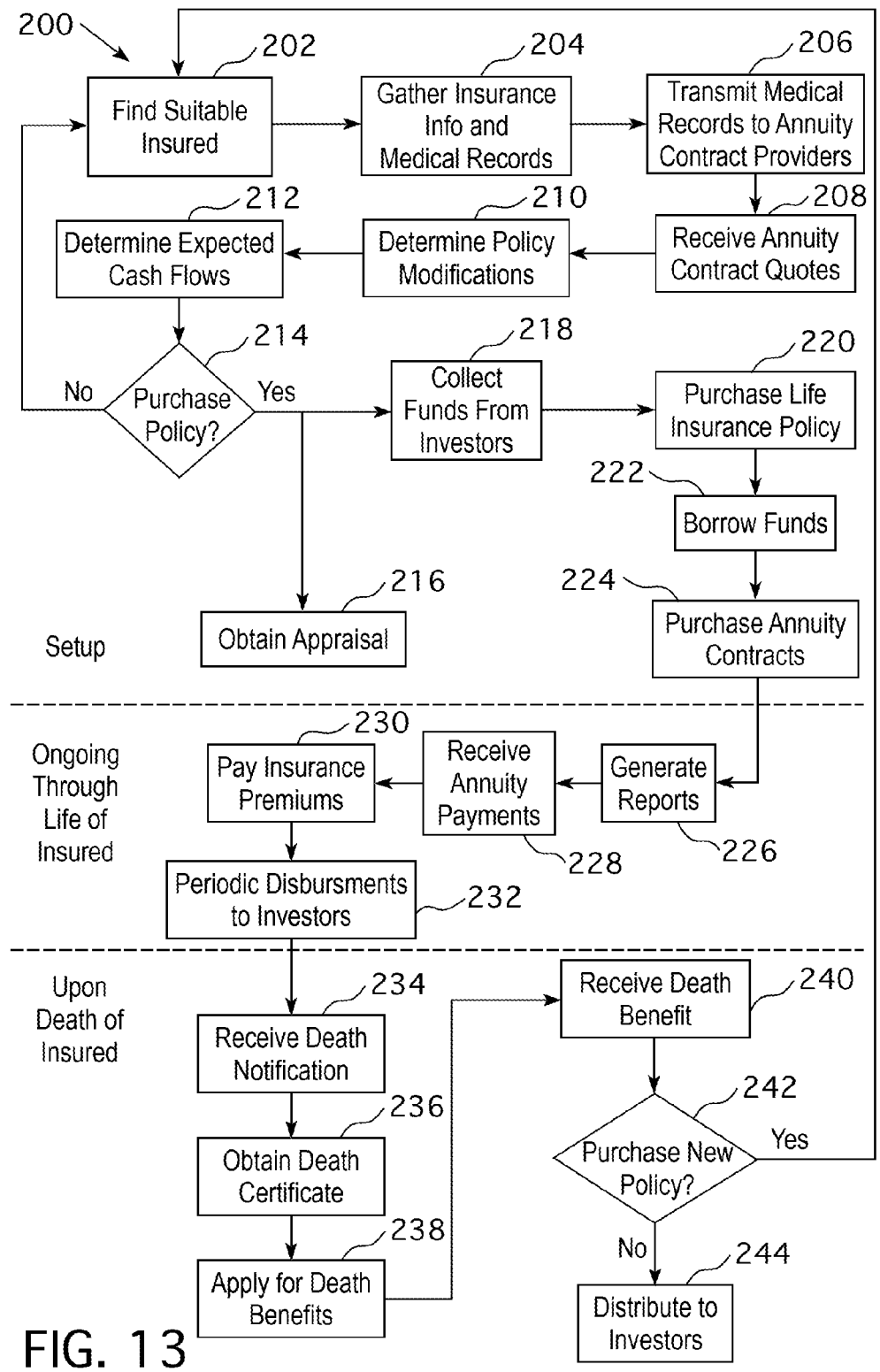
FIG. 13 is a flowchart showing an investment program according to various embodiments.

FIG. 13 is a flowchart 200 illustrating a process according to various embodiments. At step 202, the fund manager finds a suitable insured. At step 204, once a potential suitable insured has been identified, the fund manager may gather detailed insurance policy information and medical records regarding the insured. Data regarding the insured's life insurance policy and the insured's health may be stored in the computer database 146 (FIG. 12) of the computer system 140, for example. At step 206, the fund manager, via the computer system 140 and the network 150, may transmit data regarding the insured's medical records to potential annuity contract providers 126 for the purpose of receiving quotes from the annuity contract provider 126 for annuity contracts referenced to the insured. At step 210, the fund manager, via the computer system 140 and the network 150, receives quotes from the annuity contract provider 126. Data regarding the quotes may be stored in the database 146. At step 210, the fund manager, using the computer system 140, may determine the premium and other modifications needed for the insured's life insurance policy to guarantee that the life insurance death benefit will remain in force through a certain age for the insured, such as 100 years old.

At step 212, the fund manager, using the computer system 140, may compute the expected cash flow and rate of return for the fund 112 for the life expectancy of the insured based on, for example, the purchase price of the life insurance policy, as well as the quote from the annuity contract providers 126 and the life insurance premiums expected to be paid under the life insurance policy. As is to be appreciated, any expected modifications to the policy determined at step 210 may also be incorporated into the cash flow analysis. The expected cash flow of the fund 112 may be based on a selection of one or more of the annuities contracts from the quotes, where the aggregate sum of the immediate premium payment may be approximately equal to the death benefit amount of the life insurance policy to be purchased by the fund 112. In some embodiments, however, the death benefit from the life insurance policy may be greater than the immediate premium payment for the one or more annuity contracts.

At step 214, based on the expected cash flow, rate of return, and/or other potential considerations, the determination is made whether to purchase the life insurance policy 214. As illustrated in FIG. 13, if the decision is made not to purchase the life insurance policy, the process 200 may return to step 202 where another suitable insured is found and the process generally repeats. If the decision is made to purchase the policy, at step 216, the purchased life insurance policy may be appraised similarly to previously described embodiments. According to various embodiments, the purchased life insurance policy may be appraised using a computer system 90, as shown in FIG. 7. The computer system 90 may be part of the computer system 141. At step 218, the fund 112 may collect funds from investors. As described above, the investors may be any suitable type of investors, such as individual investors, institutional investors, or other investment entities, for example. Additionally, it is to be appreciated that the funds may be a collection of funds from the investors that are received at any suitable time in the process, such as before an insured is selected. As the flowchart 200 illustrates just one embodiment of the process, other embodiments may have more or fewer steps, in similar or dissimilar orders.

As shown in FIG. 13, at step 220, the life insurance policy is purchased by the fund 112. The life insurance policy may be purchased from any suitable provider in the life settlement industry. In some embodiments, the process 200 may include step 222 of borrowing funds. The borrowed funds may be collateralized by the life insurance policy and/or the annuity contracts themselves. In some embodiments, the fund 112 may not utilized borrowed funds but instead relies primarily on funds from investors. In any event, at step 224, the fund 112 may purchase annuity contracts that are tied to the life of the insured.

Throughout the life of the insured, at step 226, the computer system of the fund 112 may generate reports on the investment for the fund 112 and transmit them to the fund via the network 150, for example. The fund 112 may purchase numerous life insurance policies from different sources that are issued by separate life insurance companies and purchase corresponding SPIA contracts for each purchased life insurance contract. In some embodiments, the fund 112 may hold more than 10 life insurance policies. In some embodiments, the fund 112 may hold more than 50 life insurance policies. In some embodiments, the fund 112 may hold more than 100 life insurance policies. Data regarding each of the purchased life insurance policies and corresponding SPIA contracts may be stored in the database 146. The report generated at step 226 may summarize, for example, all or the current investments involving each of the purchased life insurance policies. The reports may be generated periodically, such as quarterly. The generated reports may detail information such as the life insurance premiums paid by the fund 112 in the reporting period, the annuity payments received by the fund 112 in the reporting period, and any death benefit payments received by the fund 112 in the case of the insured who has died. The reports may also report information such as principal portion of the annuity cash flow, the cash surrender values of the purchased life insurance polices, and other financial information related to the purchased life insurance polices and/or the annuity contracts. In one embodiment, the computer system 140 may comprise a computer based web server 148 and reports may be posted on the web server 148. The fund manager, for example, may then log into the web server using a secure password to access and/or download the report from the web server via the network 150.

Furthermore, during the life of the insured, the fund 112 may receive annuity payments from the annuity contract provider at step 228. The fund 112 may also pay insurance premiums at step 230. At step 232, disbursements may be made to investors of the fund 112. As is to be appreciated, the type and/or frequency of the disbursements from the fund 112 to the investors may depend, in part, on the structure of the fund 112. In some embodiments, disbursements to the investors may be reinvested into the fund 112 to purchase additional pairs of life insurance policies and annuity contracts.

At step 234, the computer system may receive electronic notarization from a computerized death sweep service 152 (see FIG. 12) via the network 150 when an insured has died. The fund manager may provide identifying information for the insured, such as a Social Security number, to the death sweep service 152. At step 236, the fund manager may obtain the death certificate for the deceased insured and, at step 238, the fund administrator may apply for the death benefit payment from the deceased insured's life insurance carrier on the fund's behalf. At step 240, the fund may receive the death benefit from the life insurance carrier. At step 242, it may be determined if a new policy should be purchased with the death benefit. As discussed above, this decision may be based in part on the particular structure of the fund. Closed end funds, for example, may distribute the death benefit to the investors at step 244. On the other hand, open ended funds may decide to purchase new policies by returning to step 202 to find another suitable insured.

According to various embodiments, the present disclosure is directed to a computer-implemented method that comprises computing, by a computer system, expected cash flows for an investment vehicle based on (i) an existing life insurance policy for an insured to be purchased and held by the investment vehicle and (ii) one or more Single Premium Immediate Annuity (SPIA) contracts, wherein: the life insurance policy has a death benefit payout amount payable to the owner of the life insurance policy upon the death of the insured; premium payments are owed on the life insurance policy during the life of the insured to keep the life insurance policy in force. The computer system may comprise at least one computer device that comprises a processor and a computer memory device. The at least one computer device may be programmed to compute the expected cash flows based on data regarding the life insurance policy and the one or more SPIA contracts; and the data regarding the life insurance policy and the one or more SPIA contracts may be stored in one or more computer databases of the computer system. Based on the computed expected cash flows the method may comprise purchasing, by the investment vehicle, the life insurance policy.

According to various embodiments, the present disclosure is directed to a system that comprises a computer database that stores data comprising: life insurance policy data that comprises data about a life insurance policy for an insured to be purchased by an investment vehicle, the life insurance policy having a death benefit payout amount payable to the owner of the life insurance policy upon the death of the insured, and wherein premium payments are owed on the life insurance policy during the life of the insured to keep the life insurance policy in force; and annuity contract data that comprises data about one or more Single Premium Immediate Annuity (SPIA) contracts to be purchased by the charitable organization. One or more processor circuits may be in communication with the computer database; and one or more computer memory devices may be communication with the one or more processor circuits. The one or more memory devices may store instructions that when executed by the one or more processor circuits cause the one or more processor circuits to compute expected cash flows for the investment vehicle for the life insurance policy and the one or more SPIA contracts based on life insurance policy data and annuity contract data stored in the computer database.

According to various embodiments, the present disclosure is directed to a computer-implemented method comprising identifying a life insurance policy for an insured to be purchased and held by an investment vehicle using at least a portion of an investment in the investment vehicle from at least one investor; computing, by a computer system, a cash flow for the investment vehicle based on the life insurance policy and one or more annuity contracts. The computer system may comprise at least one computer device that comprises a processor and a computer memory device, and wherein: the life insurance policy has a death benefit payout amount payable to the owner of the life insurance policy upon the death of the insured; premium payments are owed on the life insurance policy during the life of the insured to keep the life insurance policy in force; the cash flow computed by the computer system is at least partially based on data regarding the life insurance policy premium payments and the one or more annuity contracts; and the data regarding the life insurance policy and the one or more annuity contracts is stored in one or more computer databases of the computer system. When the cash flow exceeds a predefined amount, the life insurance policy may be purchased.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems 40 and 140 may each comprise one or more processors 42 and 142 in communication with memory 44 and 144 (e.g., RAM or ROM) via a data bus. The data bus may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method comprising:
identifying an existing, in-force life insurance policy for a donor to be donated to a charitable organization;
computing, by a computer system, expected cash flows for the charitable organization based on, i, ongoing premium payments for the existing, in-force life insurance policy for the donor during a lifetime of the donor, wherein the existing, in-force life insurance policy is to be donated by the donor to the charitable organization and held by the charitable organization and, ii, incoming annuity payments during the lifetime of the donor from one or more Single Premium Immediate Annuity, "SPIA," contracts that are referenced to donor and to be purchased by the charitable organization on the donor for the existing, in-force life insurance policy, wherein the computer system comprises at least one computer device that comprises a processor and a computer memory device, and wherein:
the life insurance policy has a death benefit payout amount payable to the owner of the life insurance policy upon the death of the donor;
premium payments are owed on the life insurance policy during the life of the donor to keep the life insurance policy in force;
an aggregate of single immediate premiums for the one of more SPIA contracts is not less than a predefined threshold level of the death benefit payout amount of the life insurance policy;
the at least one computer device is programmed to compute the expected cash flows based on data regarding the life insurance policy and the one or more SPIA contracts; and
the data regarding the life insurance policy and the one or more SPIA contracts is stored in one or more computer databases of the computer system; and
determining, by the computer system, an expected fixed-rate return for the charitable organization for the life of the donor that is independent of a life-expectancy of the donor, wherein the expected fixed-rate return is determined based on the expected cash flows, wherein the expected fixed-rate return is based on a difference between the incoming annuity payments from the one or more SPIA contracts and the outgoing premium payments for the life insurance policy during the lifetime of the donor;
upon a determination that the expected fixed-rate return for the charitable organization meets a threshold return, i, receiving, by the charitable organization, as a donation the life insurance policy from the donor and, ii, purchasing by the charitable organization the one or more SPIA contracts, such that the death benefit of the life insurance policy is payable to the charitable organization upon death of the donor;
during the lifetime of the donor, i, receiving, by the charitable organization, the incoming annuity payments from the one or more SPIA contracts and, ii, paying, by the charitable organization, the outgoing premium payments for the life insurance policy during the lifetime of the donor.

2. The method of claim 1, further comprising, prior to computing the expected cash flows:
receiving, by the computer system, via a computer data network, a plurality of quotes for the one or more SPIA contracts from a plurality of annuity contract providers;
storing quote data about the plurality of quotes in a computer database; and
determining the one or more SPIA contracts to purchase based on the quote data.

3. The method of claim 2, wherein each of the one or more SPIA contracts are purchased from separate annuity contract providers.

4. The method of claim 1, further comprising appraising, by an appraising computer system, a fair market value of the life insurance policy.

5. The method of claim 4, wherein the appraising computer system is the computer system.

6. The method of claim 1, further comprising:
generating, by the computer system, at least one report comprising a total amount of life insurance premiums paid by the charitable organization in a reporting period, a total of the annuity payments received by the charitable organization in the reporting period, the principal balance of at least one annuity contract, and a cash surrender value of the life insurance policy.

7. The method of claim 1, further comprising:
upon death of the donor, receiving, by the charitable organization, the death benefit payout amount.

8. The method of claim 1, wherein the aggregate of the single immediate premiums for the one of more SPIA contracts is approximately equal to the death benefit payout amount of the life insurance policy to be donated to the charitable organization.

9. The method of claim 1, wherein the aggregate of the single immediate premiums for the one of more SPIA contracts is less than the death benefit payout amount of the life insurance policy to be donated to the charitable organization.

10. A computer system comprising:
a computer database that stores data comprising:
life insurance policy data that comprises data about an existing, in-force life insurance policy to be donated by a donor to a charitable organization, the existing, in-force life insurance policy having a death benefit payout amount payable to the owner of the existing, in-force life insurance policy upon the death of the donor, and wherein premium payments are owed on the existing, in-force life insurance policy during the life of the donor to keep the life insurance policy in force; and annuity contract data that comprises data about one or more Single Premium Immediate Annuity, "SPIA," contracts to be purchased on the donor by the charitable organization and that are referenced to the donor for the existing, in-force life insurance policy, wherein an aggregate of single immediate premiums for the one of more SPIA contracts is not less than a predefine threshold level of the death benefit payout amount of the life insurance policy;

one or more processor circuits in communication with the computer database; and one or more computer memory devices in communication with the one or more processor circuits, wherein the one or more memory devices store instructions that when executed by the one or more processor circuits cause the one or more processor circuits to:

compute expected cash flows for the charitable organization for the existing, in-force life insurance policy and the one or more SPIA contracts based on life insurance policy data and annuity contract data stored in the computer database, wherein the expected cash flows for the charitable organization are computed based on, i, outgoing premium payments for the existing, in-force life insurance policy during the life of the donor and, ii, incoming annuity payments during the life of the donor from the one or more SPIA contracts, wherein an aggregate of single immediate premiums for the one or more SPIA contracts is not less than a predefined threshold level the death benefit payout amount of the existing, in-force life insurance policy;

determine an expected fixed-rate return for the charitable organization for the life of the donor that is independent of a life expectancy of the donor, wherein the expected fixed-rate return is determined based on the expected cash flows, wherein the expected fixed-rate return is based on a difference between the incoming annuity payments from the one or more SPIA contracts and the outgoing premium payments for the existing, in-force life insurance policy during the lifetime of the donor; and upon a determination that the expected fixed-rate return for the charitable organization meets a threshold return, and upon, i, receiving, by the investment vehicle, as a donation from the donor the existing, in-force life insurance policy and, ii, purchasing the one or more SPIA contracts, generating at least one report for the charitable organization, the report comprising at least a total amount of life insurance premiums paid by the charitable organization in a reporting period.

11. A computer system of claim 10, wherein each of the one or more SPIA contracts is to be purchased by the charitable organization from a separate annuity contract provider for an annuity premium amount.

12. A computer system of claim 11, the computer database storing data comprising bid amounts from the annuity contract provider.

* * * * *